H. E. VAN NESS.
SAFETY VALVE AND TIRE SIGNAL.
APPLICATION FILED DEC. 3, 1914.
1,162,668.
Patented Nov. 30, 1915.
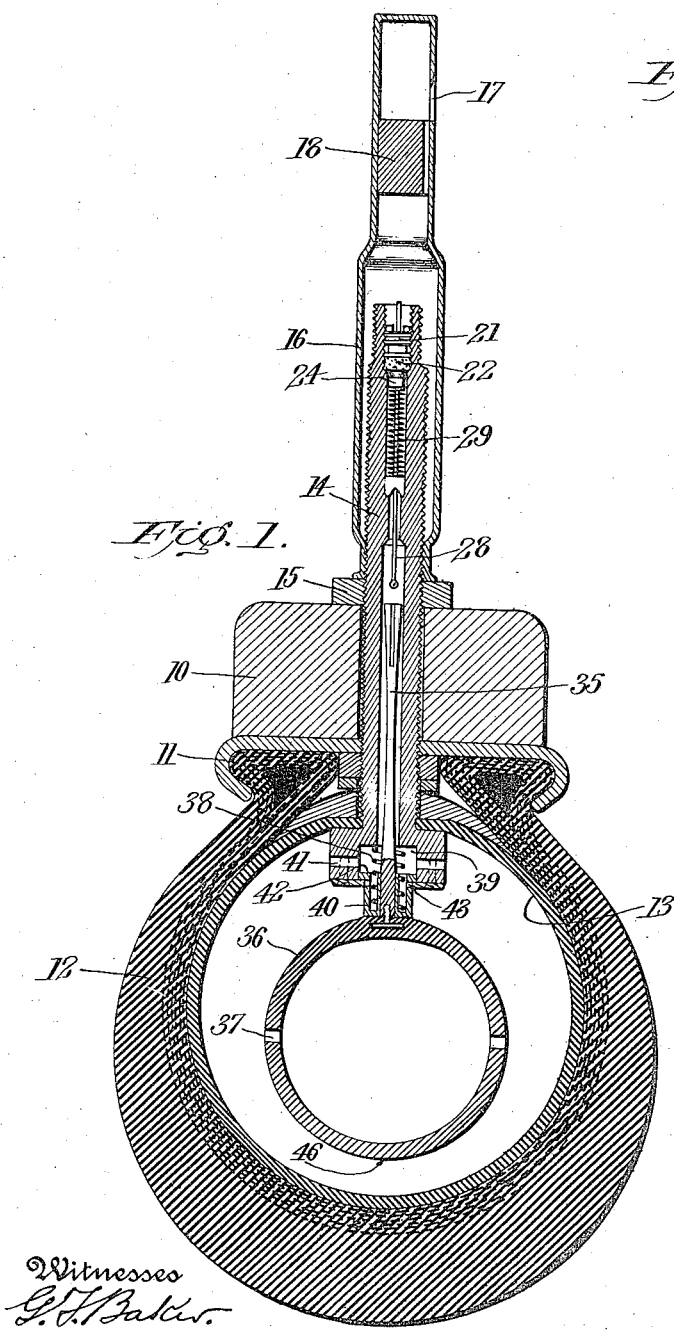
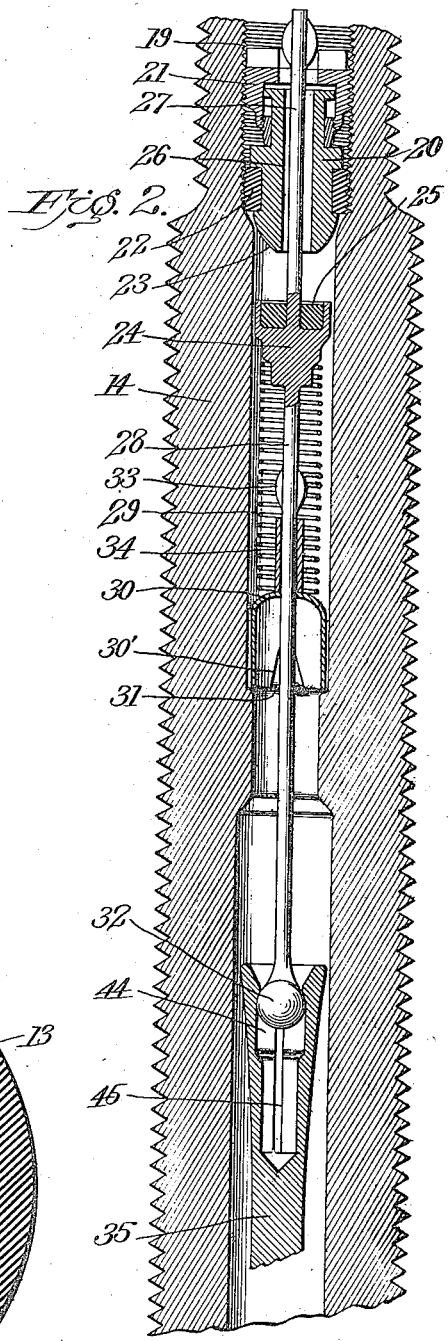
Witnesses
G. F. Baker
B. M. Kent
Inventor
Henry E. Van Ness
by Foster, Freeman, Watson & Coit
Attorneys

UNITED STATES PATENT OFFICE.

HENRY E. VAN NESS, OF ELMIRA, NEW YORK.

SAFETY-VALVE AND TIRE-SIGNAL.

1,162,668.   Specification of Letters Patent.   Patented Nov. 30, 1915.

Application filed December 3, 1914. Serial No. 875,378.

*To all whom it may concern:*

Be it known that I, HENRY E. VAN NESS, a citizen of the United States, and resident of Elmira, county of Chemung, State of New York, have invented certain new and useful Improvements in Safety-Valves and Tire-Signals, of which the following is a specification.

This invention relates to pneumatic tire valves and more particularly to means for automatically opening the valve to permit air to escape for the purpose of sounding an alarm when the pressure in the tire is below what it should be.

The invention is particularly adapted for use in connection with inwardly opening valves, this being the type which is most commonly in use.

The novel features of the invention will be apparent from the following description taken in connection with the accompanying drawings, in which, Figure 1 is a transverse section through a pneumatic tire and the filling tube therefor; Fig. 2 is an enlargement of a portion of Fig. 1.

Referring to the drawings, 10 indicates the wheel felly, 11 the rim and 12 the outer casing of the pneumatic tire. The inner tube 13, which contains the air, is provided with the usual filling tube 14 which is secured to the tube 13 in the usual manner. The tube 14 extends through the felly and rim and is secured in position by means of a nut 15 which coöperates with the external screw threads on the filling tube. A cap 16 also engages the external screw on the filling tube 14 and takes the place of the usual cap which is provided for the purpose of keeping dust and dirt out of the valve in the filling tube. The cap 16 differs from the ordinary cap in that it is provided with an opening 17 and a plug 18 so formed as to constitute a whistle device which will be sounded by air escaping from the filling tube.

Referring to Fig. 2 it will be seen that the filling tube is provided with internal threads 19 at its upper end and a valve seat member 20 is secured within the filling tube by means of a nut 21. The member 20 is surrounded by a packing 22 which prevents air from escaping around the exterior of the member and the inner end is of conical form as indicated at 23 to form a valve seat which coöperates with a valve 24 having a packing 25 adapted to engage the seat 23. The member 20 has a longitudinal opening 26 extending therethrough which permits the passage of air. The valve 24 has an outwardly projecting stem 27 and an inwardly projecting stem 28 and is normally pressed against the seat 23 by means of a light spring 29. The spring 29 engages a seat 30 which is held against movement by engagement with a shoulder 31 in the tube 14. The seat member 30 is made slightly smaller than the bore of the tube 14 and notched as at 30' to permit the passage of air from one side of this member to the other. The inner end of the stem 28 is preferably provided with an enlargement 32 and at a point between the valve 24 and the seat member 30 this stem is provided with wings 33 which are adapted to engage a tubular stop 34 which is normally supported by the member 30.

Arranged in the inner end of the filling tube 14 is a plunger 35, the inner end of which has secured thereon a cushion member 36, preferably in the form of a rubber ball having relatively thick walls which are provided with openings 37 to permit the passage of air to and from the interior thereof. A spring 38, preferably much stiffer than the spring 29, is arranged in a recess 39 in the inner end of the tube 14 and coöperates with this tube and the plunger 35 to press the latter inwardly. A cup-shaped member 40 is arranged between the plunger 35 and the ball 36 and is adapted to slide in the recess 39. Laterally extending openings 41 are arranged in the inner end of the tube 14 and permit air to pass from the tube 13 to the bore of the tube 14. When the end 42 of the member 40 engages the bottom of the recess 39 the passage of the air from the tube 13 to the bore of the tube 14 would be cut off and in order to permit such passage of the air openings 43 are arranged in the wall of the member 40. The upper end of the plunger 35 is recessed, as indicated at 44 in Fig. 2, and provided with a longitudinal slit 45 which forms tongues adapted to be separated to permit the enlarged end 32 of the valve stem to enter the recess 44. When the end 32 enters the recess 44 the tongues on the plunger 35 spring together and thus grip this enlarged end and form a connection between the plunger and the valve stem adapted to enable the valve to be opened by an inward movement of the plunger.

The operation of the device is as follows: The normal position of the parts is shown in Fig. 1, the plunger 35 being detached from the valve stem 28. It will be observed that the ball 36 is slightly spaced from the tire at the point 46 and when the pressure in the tire is not sufficient to prevent it from flattening, where in contact with the ground, to an extent permitting the tire to engage the ball 36, the latter and the plunger 35 will be moved outwardly, or upwardly, and if the flattening of the tire is sufficient the plunger 35 will be moved into gripping engagement with the valve stem 28. It will be understood that the walls of the ball 36 have sufficient resistance to cause the plunger to be moved before the ball collapses but in case of a complete deflation of the tire the ball would be collapsed with the tire when the latter, at the point opposite the ball, is in contact with the ground. For a partial deflation of the tire the ball 36 has sufficient resistance in collapsing to cause the plunger 35 to move into engagement with the valve stem, the spring 38 being at the same time compressed. When the portion of the tire opposite the ball 36 moves out of contact with the ground and the tire at this point resumes its normal shape, the spring 38 will force the ball and the plunger 35 to the normal position shown in Fig. 1, the valve 24 at the same time being opened. Just before the plunger reaches the limit of its movement the wings 33 on the valve stem engage the end of the tube 34 and thus positively stop the inward or opening movement of the valve. The plunger 35 grips the enlarged end 32 of the valve stem with sufficient force to permit the plunger to open the valve against the tension of the spring 29 and the pressure of the air in the tire on the valve. The opening of the valve 24 permits air to escape through the whistle 17, and the sounding of the whistle is a warning to the occupants of the vehicle that the pressure in the tire is too low. When the wings 33 engage the tube 34 the plunger 35 will be disengaged from the valve stem and the valve 24 will be moved against the seat 23 by the spring 29 and thus prevent the escape of air and stop the sounding of the whistle.

From the foregoing it will be evident that when the pressure in the tire is too low, the plunger 35 will be moved outwardly upon each revolution of the wheel and whenever the ball 36 is at the point of contact with the ground. This will cause a succession of warnings to be sounded by the whistle 17 and since in the ordinary operation of a vehicle any given portion of the tire is in contact with the ground for only a very short interval of time there will be only a slight amount of air escape at each revolution so that the sounding of the alarm will not cause a material loss of air from the tire.

It will be evident that the details of constructions may be varied without departing from the spirit of the invention and therefore I do not wish to be limited to the exact details shown and described.

Having described my invention what I claim is:—

1. The combination of a pneumatic tire, a filling tube therefor, an inwardly opening valve in said tube and spring actuated means in said tube and projecting into the tire for automatically opening said valve.

2. The combination of a pneumatic tire, a filling tube therefor, an inwardly opening valve in said tube, and means arranged in said tire and adapted to be automatically actuated when said tire is partially deflated, to open said valve.

3. The combination of a pneumatic tire, a filling tube therefor, an inwardly opening valve in said tube, and a plunger carried by said tube and projecting into the tire and adapted to be moved outwardly into engagement with said valve by the flattening of the tire at the point of contact with the ground.

4. The combination of a pneumatic tire, a filling tube therefor, an inwardly opening valve in said tube, a plunger carried by said tube and having one end thereof extending into the tire and adapted to be engaged by the tire, when the latter is flattened, to move the plunger outwardly in said tube, means adapted to form a connection between the outer end of said plunger and said valve, and means for moving said plunger inwardly to open said valve.

5. The combination of a pneumatic tire, a filling tube therefor, an inwardly opening valve in said tube, a plunger carried by said tube and having one end thereof extending into the tire and adapted to be engaged by the tire, when the latter is flattened, to move the plunger outwardly in said tube, means adapted to form a connection between the outer end of said plunger and said valve, means for moving said plunger inwardly to open said valve, and means for limiting the opening movement of the valve before the said plunger reaches the limit of its inward movement.

6. The combination of a pneumatic tire, a filling tube therefor, an inwardly opening valve in said tube, a plunger carried by said tube and having one end thereof extending into the tire and adapted to be engaged by the tire, when the latter is flattened, to move the plunger outwardly in said tube, means adapted to form a connection between the outer end of said plunger and said valve, means for moving said plunger inwardly to open said valve, and means for disconnecting the valve and plunger before the plunger reaches the limit of its inward movement.

7. The combination of a pneumatic tire, a filling tube therefor, an inward opening valve in said tube, a plunger arranged in the inner end of said tube and extending into the tire and having a cushion device secured to its end within the tire, and coöperating parts on said valve and plunger for forming a connection therebetween whereby the valve may be opened by an inward movement of the plunger.

8. The combination of a pneumatic tire, a filling tube therefor, an inwardly opening valve in said tube having an inwardly extending stem, a plunger arranged in the inner end of said tube and projecting into the tire, spring means for moving said plunger inwardly relatively to said tube, and coöperating parts on the outer end of said plunger and the inner end of said stem adapted to form a connection whereby said valve may be opened by said spring means.

9. The combination of a pneumatic tire, a filling tube therefor, an alarm device secured on the outer end of said tube, an inwardly opening valve in said tube, a plunger in the inner end of said tube and adapted to be moved outwardly when the tire is flattened at the point of contact with the ground, means for automatically connecting said valve and plunger when the latter is moved outwardly, and spring means for moving the plunger and valve inwardly.

10. The combination of a pneumatic tire, a filling tube therefor, an alarm device secured on the outer end of said tube, an inwardly opening valve in siad tube, a plunger in the inner end of said tube and adapted to be moved outwardly when the tire is flattened at the point of contact with the ground, means for automatically connecting said valve and plunger when the latter is moved outwardly, spring means for moving the valve and plunger inwardly and means for limiting the inward movement of the valve before said plunger reaches the limit of its inward movement.

11. The combination of an inwardly opening pneumatic tire valve, having an inwardly projecting stem, means normally spaced inwardly of said stem, and disconnected therefrom and adapted to be moved outwardly to grip said stem, and means for automatically moving said first mentioned means to open said valve.

12. The combination of an inwardly opening pneumatic tire valve having an inwardly projecting stem, and a plunger having a split recessed end adapted to engage said stem to connect the plunger and stem.

13. The combination of an inwardly opening pneumatic tire valve having an inwardly projecting stem, and a plunger adapted to be moved by the flattening of the tire when in contact with the ground, said plunger and stem having coöperating parts comprising an enlarged end on one and a split recessed end on the other adapted to interengage to permit the valve to be opened by the plunger, and means for moving said plunger to open said valve.

14. The combination of an inwardly opening pneumatic tire valve, a comparatively light spring for moving said valve outwardly against its seat, a plunger movable outwardly into gripping engagement with said valve, and a comparatively heavy spring for moving said valve and plunger inwardly against the force of the first-mentioned spring.

15. The combination of an inwardly opening pneumatic tire valve, a comparatively light spring for moving said valve outwardly against its seat, a plunger movable outwardly into gripping engagement with said valve, a comparatively heavy spring for moving said valve and plunger inwardly against the force of the first-mentioned spring, and means for effecting a disengagement of said valve and plunger before the latter reaches the limit of its inward movement.

16. The combination of an inwardly opening pneumatic tire valve, a comparatively light spring for moving said valve outwardly against its seat, a plunger movable outwardly into gripping engagement with said valve, a comparatively heavy spring for moving said valve and plunger inwardly against the force of the first-mention spring, and means for limiting the opening movement of the valve before said plunger reaches the limit of its inward movement.

In testimony whereof I affix my signature in presence of two witnesses.

HENRY E. VAN NESS.

Witnesses:
J. C. FERGUSON,
F. S. PALMITER.